Jan. 30, 1968 R. O. SOFFEL ET AL 3,366,803
SWITCH CIRCUIT
Filed May 27, 1965

INVENTORS R. O. SOFFEL
R. K. YORK
BY M. J. Rackman
ATTORNEY

United States Patent Office 3,366,803
Patented Jan. 30, 1968

3,366,803

SWITCH CIRCUIT

Robert O. Soffel, Middletown, and Robert K. York, Piscataway Township, Middlesex County, N.J., assignors to Bell Telephone Laboratories, Incorporated, New York, N.Y., a corporation of New York Filed May 27, 1965, Ser. No. 459,334
9 Claims. (Cl. 307—254)

ABSTRACT OF THE DISCLOSURE

A switch circuit operates to selectively provide a bidirectional path for signal current through a pair of series-connected transistors. When the switch circuit is disabled, a third transistor is rendered conductive to divert any signal current capacitively coupled through the collector-emitter path of one of the series-connected transistors away from the other series-connected transistor thereby improving the switch circuit's high impedance characteristic.

This invention relates to switch circuits and more particularly to serially driven two-transistor switch circuits.

Switch circuits are incorporated in a wide variety of systems in present-day technology. A common type of switch is one which normally blocks current flow but allows current to flow through it when enabled by a drive pulse. A desirable characteristic of such a switch when it does permit current flow is that there be no voltage drop across it. A desirable characteristic of the switch when it is disabled is that it permit no current flow through it.

Figure 1:
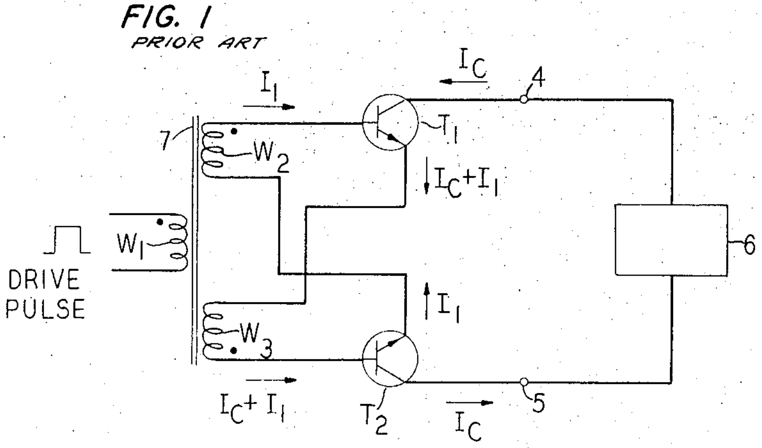
FIG. 1 PRIOR ART
Figure 2:
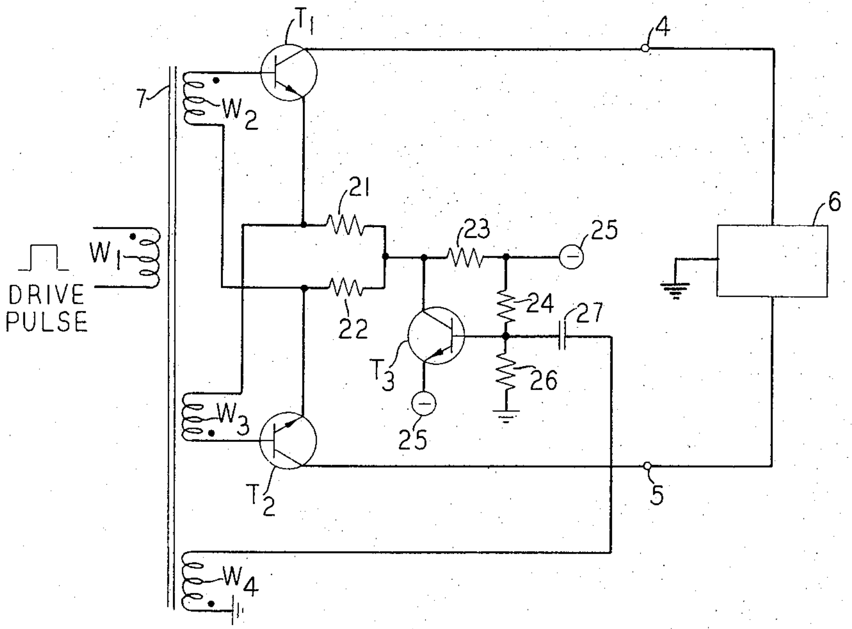

Prior art switches of this type often comprise two parallel driven transistors. An example of this prior art switch is shown in FIG. 1 of W. B. Gaunt, Jr. application Ser. No. 319,265, filed Oct. 28, 1963, and now Patent No. 3,235,753. The signal current may enter and leave the switch at the two collector electrodes. The two base-emitter junctions are connected in parallel and are driven from the same source. In the absence of a drive pulse no current flows through the switch. When the switch is enabled, current flows through it and the voltage drop across it is negligible. A shortcoming of such prior art parallel driven switches is that it is possible for one transistor to "rob" the other of base drive current, and for this reason base equalizing resistors are often required. FIG. 2 in the above-identified Gaunt application shows an improved switch circuit. The two transistors in the switch are driven in series and there is no need of base equalizing resistors to compensate for the different characteristics of the two transistors. The present invention is an improvement of the Gaunt switch and is directed to a more complete elimination of signal transmission through the switch when it is disabled.

It is a general object of this invention to provide a serially driven two-transistor switch which allows negligible signal transmission through it when disabled.

In the Gaunt circuit a load is connected between the collector terminals of the two transistors. The two base-emitter junctions are connected in series with two secondary windings of a drive transformer. When the primary winding of the transformer is pulsed, signal current flows through the two transistors. When the primary winding is not pulsed, the two transistors are nonconducting and impede current flow through them. However, each transistor exhibits an inherent junction capacitance. Although the two transistors remain off when the switch is disabled, some signal current flows through the two transistors as a result of this capacitance. Thus, the switch characteristic when disabled is less than ideal.

In accordance with an aspect of our invention a third transistor is included in the switch circuit. This transistor is connected through two respective resistors to the emitter terminals of the two transistors in the Gaunt switch. When the switch is enabled the third transistor is held nonconducting. Effectively, the additional transistor is removed from the circuit and the switch operates in the same manner as the basic Gaunt circuit. However, when the switch is disabled the third transistor conducts. Effectively, the two emitter terminals in the Gaunt circuit are short-circuited to ground as far as signal currents are concerned. Thus while neither of the two transistors in the basic circuit completely inhibits signal current flow, any signal which does get through one of the transistors due to the junction capacitance is shorted to ground rather than being transmitted through the second transistor. In this manner the switch characteristic when disabled is greatly improved. This is highly desirable. For example, if the Gaunt switch is used in a time division telephone switching system the presence of the junction capacitance in each transistor may result in crosstalk. The crosstalk may be practically eliminated if each switch is provided with an additional transistor arrangement in accordance with our invention.

It is a feature of this invention in a serially driven two-transistor switch to provide a path for diverting from either transistor any signal current which is transmitted through the other when the switch is disabled.

Further objects, features and advantages of the invention will become apparent upon consideration of the following detailed description in conjunction with the drawing in which:

FIG. 1 is identical to FIG. 2 in the above-identified Gaunt application and is a schematic representation of the serially driven switch disclosed therein; and FIG. 2 is a schematic representation of an illustrative embodiment of our invention.

Referring to FIG. 1, in the absence of a drive pulse transistors $T_1$ and $T_2$ are nonconducting and present a high impedance to signal currents from load 6 which comprises a signal source. When signal current is to flow through the switch circuit from load 6, a drive pulse is applied to primary winding $W_1$. Each of the secondary windings $W_2$ and $W_3$ is connected between the base of one transistor and the emitter of the other. The voltages induced in the two secondary windings cause current to flow through the transistors. Assuming that a transmission current $I_c$ flows in the direction shown and that a base current $I_1$ flows into the base of transistor $T_1$, the currents in the remainder of the switch circuit are easily determined, and are as shown in FIG. 1. In prior art parallel driven switches if one of the two transistors requires a large base drive, there may be insufficient drive current remaining for the other transistor. Such is not the case in the Gaunt switch however because of the series drive connection.

As described above the switch does allow some signal transmission through it even when it is disabled. Although neither transistor conducts, there is an inherent capacitance between the collector and emitter terminals of each transistor. Thus, some signal current is transmitted through the switch even when it is disabled. The improved switch of our invention is shown in FIG. 2. To the basic Gaunt switch we have added a third secondary winding $W_4$ and a third transistor $T_3$ connected to the two emitter terminals in the Gaunt switch by respective resistors 21 and 22. In the absence of a drive pulse applied to winding $W_1$ transistor $T_3$ conducts. The emitter terminal of this transistor is connected to the negative source 25. Due to the voltage divider action of resistors 24 and 26 the base of the transistor is held at a potential less negative than that of source 25. Consequently, the base-emitter junction of transistor $T_3$ is forward biased and transistor $T_3$ conducts. Consider a signal transmitted through the junction capacitance of transistor $T_1$. The signal in the switch of FIG. 1 is transmitted through winding $W_3$ and the base-collector junction of transistor $T_2$. However, in the switch of FIG. 2 the signal is short-circuited through the relatively small resistor 21 and transistor $T_3$ to source 25. Consequently, any signal current from transistor $T_1$ is diverted from transistor $T_2$. Similarly, any signal current which is transmitted through transistor $T_2$ is diverted through resistor 22 and transistor $T_3$ and cannot flow through transistor $T_1$. Thus when the switch is disabled the high impedance characteristic is greatly improved.

One other difference between the circuit of FIG. 2 and that of FIG. 1 should be noted. In the switch of FIG. 1 the source voltages for the two transistors are included in the load. The Gaunt switch is not limited for use with loads which include supply voltages. It is also possible to apply the necessary supply voltages at the emitters of the two transistors. Such is the case in FIG. 2 and with such a configuration it is not necessary that the load include a supply voltage. Of course in this case load 6 must include a ground reference to provide a return path to the load from the supply voltages in the switch circuit of FIG. 2. Load devices having two terminals and a ground reference are well known in the art and may comprise impedance means connected between a signal source and the ground reference terminal. The bias circuit for FIG. 2 has one advantage over that in FIG. 1—even in the absence of transistor $T_3$. The emitter terminals of transistors $T_1$ and $T_2$ are connected through respective 75-ohm resistors 21 and 22, and through 5K resistor 23 to negative source 25 at all times. When the switch is off this resistor connection in itself improves the high impedance characteristic of the switch because the resistor network diverts some current transmitted through one of the transistors from the other. The short-circuit provided by transistor $T_3$ is of course more effective than the connection to negative source 25 through impedance 23 because when this transistor conducts the impedance it presents is negligible compared with the impedance of resistor 23. Thus, when transistor $T_3$ is inhibited and rendered nonconductive, relatively little current flows through impedance 23 to negative source 25 but when transistor $T_3$ is conductive, substantially the entire current from resistors 21 and 22 flows through it to negative source 25 and therefrom via a ground return path to the ground reference of load 6.

When a drive pulse is applied to primary winding $W_1$ a negative pulse is induced in winding $W_4$. This negative pulse is transmitted through capacitor 27 to the base of transistor $T_3$ to reverse bias the base-emitter junction of the transistor. Winding $W_4$ and capacitor 27 form a path to inhibit conduction of the transistor $T_3$ when a negative pulse is applied to winding $W_4$. Effectively, the transistor is removed from the circuit and signal currents transmitted through transistors $T_1$ and $T_2$ are not shorted through resistors 21 and 22 and transistors $T_3$ to negative source 25. It is necessary that resistors 21 and 22 be included in the circuit for isolation purposes. Were these resistors omitted, the two emitter terminals would be connected together at the junction of resistor 23 and the collector of transistor $T_3$. The two transistors would not be driven in series. By including the two 75-ohm resistors the required isolation is obtained. Current leaving the emitter terminal of transistor $T_1$ can flow through either resistor 21, or winding $W_3$ and the base-collector junction of transistor $T_2$. Since the latter path offers an impedance for less than 75 ohms when transistor $T_2$ conducts, the emitter current from transistor $T_1$ chooses the latter path. Similar remarks apply to the emitter current of transistor $T_2$. In the absence of a drive pulse however the impedance seen looking into winding $W_2$ or $W_3$ is far greater than 75 ohms and the emitter terminals are effectively short-circuited to negative source 25 through very low impedances as desired.

Although the invention has been described with reference to a specific embodiment, it is to be understood that this embodiment is only illustrative of the application of the principles of the invention and that various modifications may be made therein and other arrangements may be devised without departing from the spirit and scope of the invention.

What is claimed is:

1. A switch circuit comprising first and second transistors each having emitter, base and collector electrodes, load means connected between the collector electrodes of said first and second transistors, a drive transformer having a primary winding and first and second secondary windings, said first secondary winding being connected between said base electrode of said first transistor and said emitter electrode of said second transistor, said second secondary winding being connected between said base electrode of said second transistor and said emitter electrode of said first transistor, first and second resistors each having one terminal connected to respective ones of said emitter electrodes, a third transistor connected to the other terminals of said first and second resistors, said other terminals of said resistors being connected to each other, means for normally biasing said third transistor to conduction, means for energizing said primary winding to render said first and second transistors conductive, and means operative with the energization of said primary winding for turning off said third transistor.

2. A switch circuit comprising first and second transistors each having first, second and third electrodes, load means connected between the third electrodes of said first and second transistors, a drive transformer having a primary winding and first and second secondary windings, said first secondary winding being connected between said first electrode of said first transistor and said second electrode of said second transistor, said second secondary winding being connected between said first electrode of said second transistor and said second electrode of said first transistor, a third transistor, means individually connecting said first electrode of each of said first and second transistors to said third transistor, means for normally biasing said third transistor to conduction, means for energizing said primary winding to render said first and second transistors conductive, and means operative with the energization of said primary winding for inhibiting conduction in said third transistor.

3. A switch circuit in accordance with claim 2 wherein said inhibiting means includes a third secondary winding on said drive transformer.

4. A switch circuit comprising first and second transistors each having emitter, base and collector electrodes, load means connected between the collector electrodes of said first and second transistors, driving means having an input and an output circuit, means for serially connecting said output circuit and the base-emitter junctions of each of said first and second transistors, means for energizing the input circuit of said driving means to render said first and second transistors connected to said output circuit conductive, and means individually coupled to said emitter electrodes for diverting current transmitted through either of said transistors from the other of said transistors in the absence of the energization of said driving means.

5. A switch circuit comprising first and second transistors each having emitter, base and collector electrodes, load means connected between the collector electrodes of said first and second transistors, driving means having an input and an output circuit, means for serially connecting said output circuit and the base-emitter junctions of each of said first and second transistors, means for biasing said first and second transistors to nonconduction, and means connected to the emitter electrodes of said first and said second transistors for presenting a low impedance to signals transmitted through one of said first and second transistors when said first and second transistors are biased to nonconduction.

6. A switch circuit comprising first and second switching devices, each of said switching devices having an output terminal and a drive circuit including first and second terminals, load means connected between said output terminals of said first and second switching devices, a drive transformer having a primary winding and first and second secondary windings, means for connecting said first secondary winding between said first terminal of said first switching device and said second terminal of said second switching device, means for connecting said second secondary winding between said first terminal of said second switching device and said second terminal of said first switching device, means for energizing the primary winding of said drive transformer to render said first and second switching devices conductive, and means individually connected to the first terminal of each of said switching devices for diverting current transmitted through either of said switching devices from the other of said switching devices in the absence of the energizaiton of said drive transformer.

7. A switch circuit comprising first and second switching devices, each of said switching devices having an output terminal and a drive circuit including first and second terminals, load means connected between said output terminals of said first and second switching devices, a drive transformer having a primary winding and first and second secondary windings, means for connecting said first secondary winding between said first terminal of said first switching device and said second terminal of said second switching device, means for connecting said second secondary winding between said first terminal of said second switching device and said second terminal of said first switching device, means for biasing said first and second switching devices to nonconduction, and means connected to said first and second switching devices for presenting a low impedance to signals transmitted through said switching devices when said switching devices are biased to nonconduction.

8. A switch circuit comprising first and second switching devices each having an output teminal and a drive circuit, signal means connected between the output terminals of said first and second switching devices, an enabling circuit, means for connecting said enabling circuit and said drive circuits of said first and second switching devices in series, means for operating said enabling circuit to permit signals from said signal means to pass through said first and second switching devices, and means connected to said first and second switching devices for diverting signals transmitted through either of said devices from the other of said devices when said enabling circuit is unoperated.

9. A switch circuit comprising first and second switching devices each having an output terminal and a drive circuit, signal means connected between the output terminals of said first and second switching devices, an enabling circuit, means for connecting said enabling circuit and said drive circuits of said first and second switching devices in series, means for operating said enabling circuit to permit signals from said signal means to pass through said switching devices, and means connected to said first and second switching devices for presenting a low impedance to signals transmitted through either of said devices in the absence of the operation of said enabling circuit.

No references cited.

ARTHUR GAUSS, *Primary Examiner.*

JOHN ZAZWORSKY, *Examiner.*